United States Patent
Kwon

(10) Patent No.: US 10,411,275 B2
(45) Date of Patent: Sep. 10, 2019

(54) FUEL CELL COOLING SYSTEM

(71) Applicants: HYUNDAI MOTOR COMPANY, Seoul (KR); KIA MOTORS CORPORATION, Seoul (KR)

(72) Inventor: Hyuck Roul Kwon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 155 days.

(21) Appl. No.: 15/830,895

(22) Filed: Dec. 4, 2017

(65) Prior Publication Data

US 2018/0166711 A1    Jun. 14, 2018

(30) Foreign Application Priority Data

Dec. 12, 2016 (KR) .................. 10-2016-0168772

(51) Int. Cl.
| | |
|---|---|
| H01M 8/04 | (2016.01) |
| H01M 8/04007 | (2016.01) |
| H01M 8/1018 | (2016.01) |
| H01M 8/04014 | (2016.01) |
| H01M 8/04119 | (2016.01) |
| H01M 8/04029 | (2016.01) |

(52) U.S. Cl.
CPC ... *H01M 8/04059* (2013.01); *H01M 8/04014* (2013.01); *H01M 8/04029* (2013.01); *H01M 8/04126* (2013.01); *H01M 8/04134* (2013.01); *H01M 8/04156* (2013.01); *H01M 8/04164* (2013.01); *H01M 8/1018* (2013.01); *H01M 2008/1095* (2013.01); *H01M 2250/20* (2013.01); *Y02E 60/521* (2013.01); *Y02T 90/32* (2013.01)

(58) Field of Classification Search
CPC ........................................................ H01M 8/04
See application file for complete search history.

(56) References Cited

U.S. PATENT DOCUMENTS

| | | | |
|---|---|---|---|
| 6,651,761 B1 | 11/2003 | Hrovat et al. | |
| 2015/0128632 A1* | 5/2015 | Kishita | B60H 1/00271 62/324.6 |

FOREIGN PATENT DOCUMENTS

| | | |
|---|---|---|
| KR | 10-2007-0050194 A | 5/2007 |
| KR | 10-2011-0051829 A | 5/2011 |
| KR | 10-2013-0066102 A | 6/2013 |
| KR | 10-2016-0103507 A | 9/2016 |
| KR | 10-01776414 B1 | 9/2017 |

OTHER PUBLICATIONS

"Spray Nozzle," <https://en.wikipedia.org/wiki/Spray_nozzle> Nov. 23, 2017, Wikipedia, 8 pages.

* cited by examiner

*Primary Examiner* — Jacob B Marks
(74) *Attorney, Agent, or Firm* — McDonnell Boehnen Hulbert & Berghoff LLP

(57) ABSTRACT

Provided is a fuel cell cooling system including: a heat exchange unit including a radiator dissipating heat contained in a coolant and an evaporator disposed to exchange heat with the radiator and evaporating water using the heat from the radiator to humidify outside air; and an air compressor compressing the outside air passing through the evaporator and supplying the compressed air to a fuel cell stack.

19 Claims, 8 Drawing Sheets

FUEL CELL COOLING SYSTEM

CROSS-REFERENCE TO RELATED APPLICATION

This application is based on and claims the benefit of priority to Korean Patent Application No. 10-2016-0168772, filed on Dec. 12, 2016, in the Korean Intellectual Property Office, the disclosure of which is incorporated herein in its entirety by reference.

TECHNICAL FIELD

The present disclosure relates to a fuel cell cooling system.

BACKGROUND

A fuel cell is a device that can produce electricity by converting chemical energy from a fuel into electrical energy through an electrochemical reaction within a fuel cell stack (hereinafter referred to as the "stack"), instead of converting the chemical energy from the fuel into heat through combustion. Fuel cells may not only provide power for industries, households, and vehicles, but may also be applied to power small electric/electronic products, especially, portable devices.

For example, proton exchange membrane fuel cells (PEMFCs), also known as polymer electrolyte membrane fuel cells, are extensively being studied as a power source for driving vehicles. Such a PEMFC includes: a membrane electrode assembly (MEA) having catalyst electrode layers, in which an electrochemical reaction occurs, attached to both sides of an electrolyte membrane through which hydrogen ions move; gas diffusion layers (GDLs) serving to uniformly distribute reactant gases and deliver electrical energy that is generated; gaskets and coupling members for maintaining air tightness of the reactant gases and a coolant and appropriate clamping pressure; and bipolar plates allowing the reactant gases and the coolant to move therethrough.

In the aforementioned fuel cell, a fuel, usually hydrogen, and an oxidizing agent, usually oxygen (air), are supplied to an anode and a cathode of the MEA, respectively, through a flow path of the bipolar plate. Hydrogen is supplied to the anode (also called "fuel electrode", "hydrogen electrode", or "oxidation electrode"), and oxygen (air) is supplied to the cathode (also called "air electrode", "oxygen electrode", or "reduction electrode").

Hydrogen supplied to the anode is split into hydrogen ions (protons, H+) and electrons (e−) by a catalyst of the electrode layers provided on both sides of the electrolyte membrane, and only the protons selectively pass through the electrolyte membrane, which is a cation exchange membrane, to be delivered to the cathode, while the electrons are delivered to the cathode through the GDL and the bipolar plate, which are conductors.

In the cathode, the protons supplied through the electrolyte membrane and the electrons supplied through the bipolar plate meet and react with oxygen of the air supplied to the cathode by an air supply system to produce water. The movement of the protons leads to the flow of the electrons through a wire, thereby creating electric current.

A fuel cell system mounted in a vehicle is primarily made up of: a stack generating electrical energy; a fuel supply system supplying a fuel (hydrogen) to the stack; an air supply system supplying oxygen of the air to the stack as an oxidizing agent required for electrochemical reaction; and a thermal management system (TMS) removing reaction heat from the stack out of the system and controlling the operating temperature of the stack.

As is generally known, the TMS includes a TMS line through which a coolant for cooling the stack circulates, and a radiator provided on the TMS line and dissipating heat of the coolant externally. Because the reaction heat from the fuel cell system is relatively greater than heat produced by an internal combustion engine system, the radiator of the fuel cell system requires relatively high heat dissipation performance compared to a radiator in the internal combustion engine system. However, a conventional fuel cell system may not exhibit sufficient heat dissipation performance of the radiator due to constraints of installation space or other installation environment issues. Accordingly, in the conventional fuel cell system, as the time taken for the coolant to reach a predetermined temperature limit is short, the output of the stack may be lowered.

Meanwhile, as the electrolyte membrane of the MEA is fully soaked with water, the ion conductivity increases and loss caused by resistance decreases. When reactant gases of low relative humidity are continuously supplied, the electrolyte membrane may become dried out and thus longer usable. Because humidification of the supplied gases is essential in a fuel cell system, a conventional fuel cell system includes a hollow fiber membrane humidifier able to perform moisture exchange between humidified air discharged from the stack and outside air to be supplied to the stack using a hollow fiber membrane. However, such a conventional fuel cell system is problematic in that the amount of the outside air humidified by only the hollow fiber membrane humidifier may not be sufficient, and the installation of the hollow fiber membrane humidifier may be costly.

SUMMARY

The present disclosure has been made to solve the above-mentioned problems occurring in the prior art while advantages achieved by the prior art are maintained intact.

In one aspect, the present disclosure provides a fuel cell cooling system having a novel structure for improving heat dissipation performance of a radiator.

In a further aspect, the present disclosure provides a fuel cell cooling system having a novel structure allowing reduced humidifier installation costs.

In yet a further aspect, the present disclosure provides a fuel cell cooling system having a novel structure providing increased humidification of outside air.

According to an aspect of the present disclosure, a fuel cell cooling system comprises: a heat exchange unit having a radiator dissipating heat contained in a coolant and an evaporator disposed to exchange heat with the radiator and evaporate water using the heat from the radiator to humidify outside air; and an air compressor compressing the outside air passing through the evaporator and supplying the compressed air to a fuel cell stack.

The fuel cell cooling system may further comprise: an outside air intake line connected to an outside air inlet of the air compressor, wherein outside air is introduced to the outside air intake line; and an outside air supply line connecting an outside air outlet of the air compressor to an outside air inlet of the fuel cell stack.

The outside air intake line may include: a first intake line to which the outside air is introduced; a second intake line allowing outside air to bypass the first intake line and pass through the evaporator; and a third intake line delivering the outside air passing through the first intake line and the second intake line to the outside air inlet of the air compressor.

The fuel cell cooling system may further comprise: an outside air control valve including a first port connected to the first intake line, a second port connected to the second intake line, and a third port connected to the third intake line, wherein opening or closing the individual ports allows the outside air to flow through the second intake line at a predetermined ratio compared to the flow of air in the first intake line.

The water for evaporation may be condensate water produced by the fuel cell stack.

The fuel cell cooling system may further include: a condensate line connecting a humidified air outlet of the fuel cell stack to a water inlet of the evaporator; a condensate tank provided on the condensate line and storing the condensate water produced through condensation of moisture contained in humidified air discharged from the fuel cell stack; and a condensate valve provided between the condensate tank and the water inlet on the condensate line, the opening or closing of which controls flow in the condensate line.

The heat exchange unit may further include a cooling fan allowing cooling air to flow for heat exchange with the radiator and the evaporator.

The radiator may include a first radiator positioned downstream of the evaporator in the flow path of the cooling air.

The radiator may further include a second radiator positioned upstream of the evaporator in the flow path of the cooling air.

The fuel cell cooling system may further include: a coolant radiating line delivering the coolant discharged from a coolant outlet of the fuel cell stack to each of the first radiator and the second radiator; and a coolant recovery line recovering the coolant passing through the coolant radiating line to introduce the coolant to a coolant inlet of the fuel cell stack.

The coolant radiating line may include: a first radiating line connected to the coolant outlet; a second radiating line connecting the first radiating line to the coolant recovery line and having the first radiator provided thereon; and a third radiating line connecting the second radiating line to the coolant recovery line and having the second radiator provided thereon.

The evaporator may be provided with a spray nozzle that sprays the water for evaporation into the outside air that is passing through an interior space of the evaporator.

The evaporator may be provided with a two-fluid nozzle for mixing and spraying the outside air passing through the air compressor and the water for evaporation.

The fuel cell cooling system may further include an outside air bypass line connecting an outside air outlet of the air compressor to an air inlet of the two-fluid nozzle.

The fuel cell cooling system may further include a humidifier disposed between the air compressor and the fuel cell stack, wherein the humidifier further humidifies the outside air discharged from the air compressor using humidified air discharged from the fuel cell stack.

The evaporator may be provided with a two-fluid nozzle for mixing and spraying the humidified air and the water for evaporation.

The fuel cell cooling system may further include a humidified air bypass line connecting a humidified air outlet of the humidifier to an air inlet of the two-fluid nozzle.

The heat exchange unit may further include a heat conducting layer interposed between the radiator and the evaporator.

The heat conducting layer may be formed of brazing filler.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
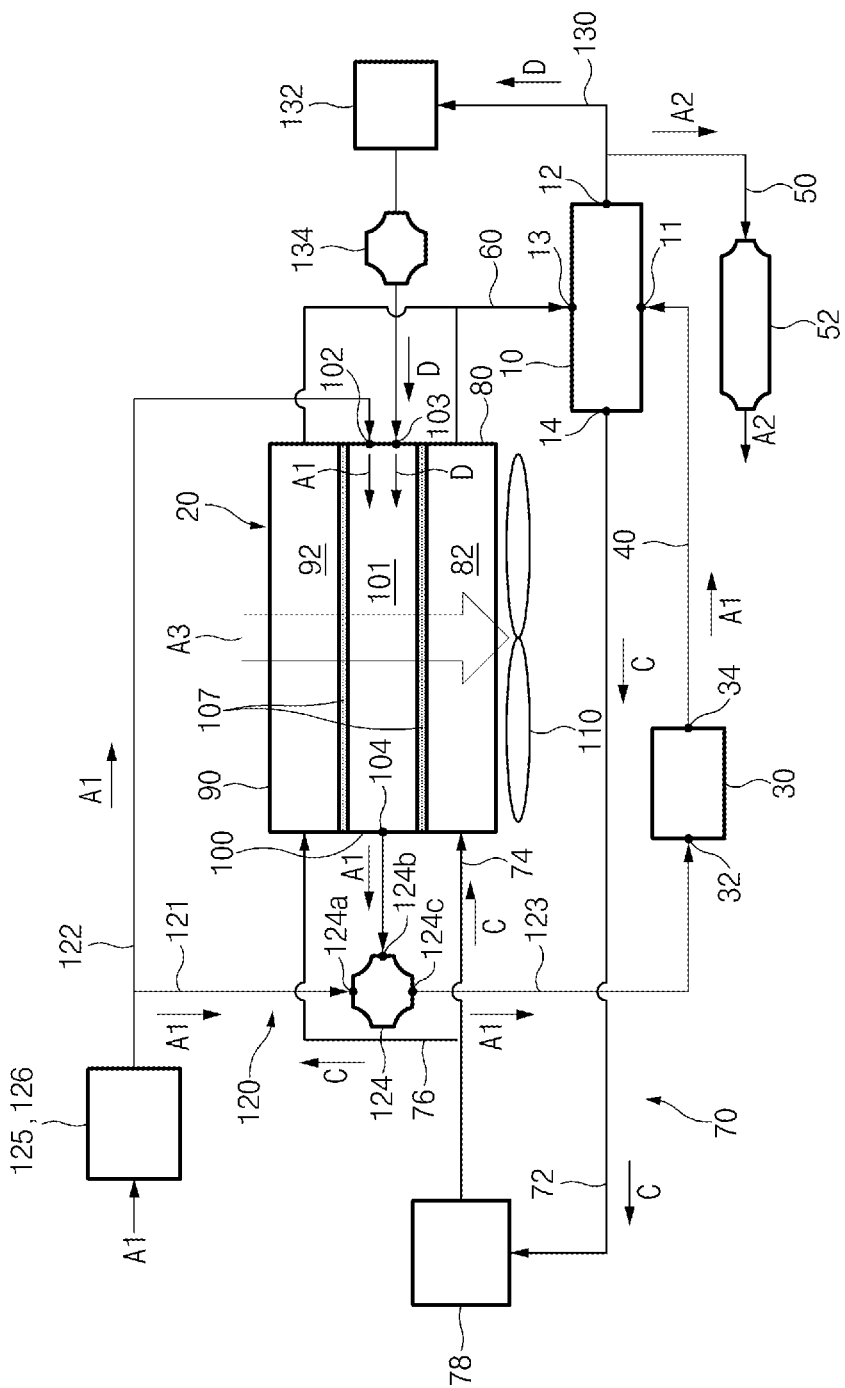
FIG. 1 illustrates the configuration of a fuel cell cooling system, according to a first example embodiment of the present disclosure.

Hereinafter, example embodiments of the present disclosure are described in detail with reference to the accompanying drawings. Terms or words used in the present specification and claims should not be interpreted as being limited to accepted meanings or dictionary definitions, but should be interpreted as having meanings and concepts that comply with the technical ideas of the present disclosure based on the principle by which an inventor can appropriately define the concepts of the terms or words in order to describe the invention in the best way. Therefore, the embodiments described in the specification and the configuration of elements illustrated in the drawings are merely considered to be preferred embodiments and do not represent all the technical ideas of the present disclosure. It should be understood that various equivalents and modifications may exist at the time of filing this application.

In the drawings, the shapes and dimensions of elements or portions of the elements may be exaggerated or schematically illustrated for convenience of explanation and clarity. In addition, a detailed description of a related known function or configuration may not be provided in order not to unnecessarily obscure the gist of the present disclosure.

FIG. 1 illustrates the configuration of a fuel cell cooling system, according to a first example embodiment of the present disclosure.

Referring to FIG. 1, a fuel cell cooling system 1 according to the first embodiment of the present disclosure includes: a fuel cell stack (hereinafter referred to as "the stack 10") generating electricity through the oxidation-reduction reaction of hydrogen and oxygen; a heat exchange unit 20 that exchanges heat between a coolant C and evaporation water to enable the cooling of the coolant C and the humidification of outside air A1; and an air compressor 30 compressing outside air A1 humidified by heat exchange unit 20 and supplying the compressed air to stack 10.

As illustrated in FIG. 1, stack 10 includes an outside air inlet 11 through which outside air A1 is introduced, a humidified air outlet 12 from which humidified air A2 is discharged, a coolant inlet 13 through which coolant C is introduced, and a coolant outlet 14 from which coolant C is discharged.

Outside air inlet 11 may be connected to an outside air outlet 34 of the air compressor 30 through an outside air supply line 40. Outside air A1 compressed by air compressor 30 may be introduced to outside air inlet 11 through outside air supply line 40.

Humidified air outlet 12 may be connected to a humidified air exhaust line 50. Humidified air A2 including water produced in stack 10 may be discharged from the humidified air outlet 12, and the discharged humidified air A2 may be discharged externally through the humidified air exhaust line 50. Humidified air exhaust line 50 may be provided with a pressure control valve 52, the opening or closing of which controls the discharge pressure of humidified air A2.

Coolant inlet 13 may be connected to a coolant recovery line 60. Coolant recovery line 60 may be connected to a coolant radiating line 70 to recover the coolant C cooled by first and second radiators 80 and 90. Thus, the coolant C cooled by first and second radiators 80 and 90 may be introduced to the coolant inlet 13 through the coolant recovery line 60.

Coolant outlet 14 may be connected to coolant radiating line 70, and the coolant C discharged from the coolant outlet 14 may be introduced to the coolant radiating line 70. Coolant radiating line 70 may deliver coolant C discharged from coolant outlet 14 to first radiator 80 and second radiator 90. For example, coolant radiating line 70 may include a first radiating line 72 connected to coolant outlet 14, a second radiating line 74 connecting first radiating line 72 to the coolant recovery line 60 through first radiator 80, and a third radiating line 76 connecting first radiating line 72 to coolant recovery line 60 through second radiator 90. Thus, coolant C may be distributed to first radiator 80 and second radiator 90 to pass therethrough. Meanwhile, as illustrated in FIG. 1, first radiating line 72 may be provided with a coolant pump 78 pumping coolant C discharged from coolant outlet 14 to second radiating line 74 and third radiating line 76.

Figure 2:
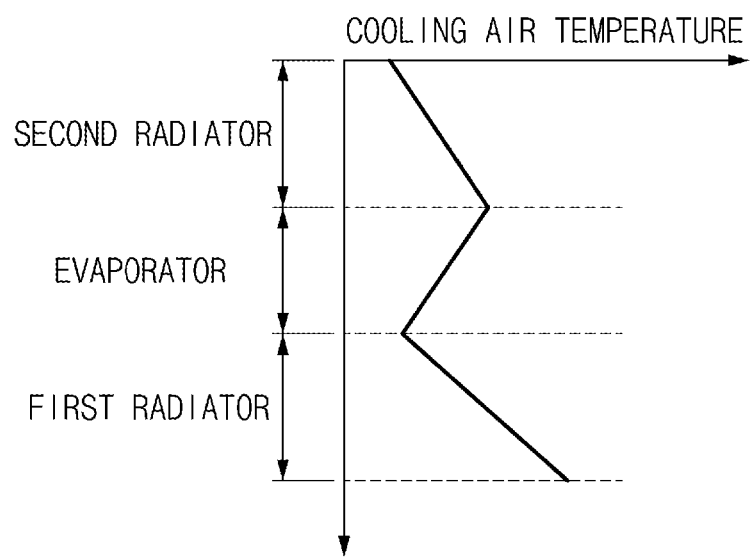
FIG. 2 illustrates changes in temperature of cooling air passing through a heat exchange unit of the fuel cell cooling system illustrated in FIG. 1.

FIG. 2 illustrates the changes in temperature of cooling air passing through the heat exchange unit illustrated in FIG. 1.

Heat exchange unit 20 includes first and second radiators 80 and 90 able to dissipate heat contained in coolant C discharged from stack 10; an evaporator 100 evaporating water using the heat from first and second radiators 80 and 90 to humidify outside air A1, and a cooling fan 110 allowing cooling air A3 to flow so as to accelerate the heat dissipation of first and second radiators 80 and 90 and the heat exchange between the first and second radiators 80 and 90 and evaporator 100.

As illustrated in FIG. 1, first and second radiators 80 and 90 include first radiator 80 is positioned downstream of evaporator 100 in the flow path of cooling air A3, and second radiator 90 is upstream of evaporator 100.

First radiator 80 may be disposed on second radiating line 74 to allow coolant C to pass through an interior space 82 of first radiator 80, and be positioned downstream of evaporator 100 and the second radiator 90 in the flow path of cooling air A3. First radiator 80 may dissipate the heat contained in coolant C externally to cool coolant C. Cooling air A3 may pass through the outer surface of first radiator 80 to undergo heat exchange with first radiator 80, thereby accelerating the heat dissipation of first radiator 80. The temperature of cooling air A3 may be gradually increased in the course of passing through first radiator 80, as illustrated in FIG. 2.

As illustrated in FIG. 1, second radiator 90 may be disposed on third radiating line 76 to allow coolant C to pass through an interior space 92 of second radiator 90, and may be positioned upstream side of first radiator 80 and evaporator 100 in the flow path of cooling air A3. S second radiator 90 may dissipate the heat contained in coolant C externally to cool coolant C. Cooling air A3 may pass through the outer surface of second radiator 90 to undergo heat exchange with second radiator 90, thereby accelerating the heat dissipation of second radiator 90. The temperature of cooling air A3 may be gradually increased in the course of passing through second radiator 90, as illustrated in FIG. 2.

Evaporator 100 may be disposed on an outside air intake line 120 and a condensate line 130 to allow the evaporation water and the outside air A1 to pass through an interior space 101 thereof. In addition, evaporator 100 may be disposed upstream of first radiator 80 and downstream of second radiator 90 in the flow path of.

A heat-conducting layer 107 may be interposed between evaporator 100 and first radiator 80 and/or between evaporator 100 and second radiator 90. Heat-conducting layer 107 may be formed of brazing filler or a material having high thermal conductivity. Heat conducting layer 107 may accelerate heat exchange between evaporator 100 and the first and second radiators 80 and 90 to efficiently transfer the heat from first and second radiators 80 and 90 to evaporator 100. Evaporator 100 may be disposed to be spaced apart from the first and second radiators 80 and 90 by a predetermined gap to provide indirect heat exchange with first and second radiators 80 and 90 through the radiation and convection of heat.

As illustrated in FIG. 1, evaporator 100 includes an outside air inlet 102 connected to a second intake line 122 of the outside air intake line 120, a water inlet 103 connected to the condensate line 130, and an outside air outlet 104 connected to a second port 124b of an outside air control valve 124. As illustrated in FIG. 1, outside air inlet 102, water inlet 103, and outside air outlet 104 may be disposed such that the direction in which outside air A1 and the evaporation water pass through evaporator 100 is opposite to the direction in which coolant C passes through first and second radiators 80 and 90. However, other flow configurations may also be used. For convenience of explanation, outside air intake line 120 and condensate line 130 will be described before evaporator 100 is detailed.

One end of outside air intake line 120 may be connected to an outside air inlet 32 of air compressor 30, and the other end of the outside air intake line 120 may be open to communicate with the outside. Outside air A1 sucked from the outside by back pressure from air compressor 30 may be introduced to outside air intake line 120.

Outside air intake line 120 may be configured to allow outside air A1 to selectively pass through evaporator 100. For example, as illustrated in FIG. 1, outside air intake line 120 includes a first intake line 121 to which outside air A1 sucked in by the back pressure is introduced, a second intake line 122 bypassing outside air A1 to evaporator 100, and a third intake line 123 delivering outside air A1 that has passed through first intake line 121 and second intake line 122 to outside air inlet 32 of air compressor 30. In other words, outside air intake line 120 may be configured to allow outside air A1 to pass through first intake line 121 and/or the second intake line 122 selectively and meet in the third intake line 123. First intake line 120 may be provided with a flow sensor 125 measuring a flow rate of outside air A1, and a filter 126 filtering outside air A1.

The method for connecting first intake line 121 and second intake line 122 to third intake line 123 is not particularly limited. For example, outside air intake line 120 may be further provided with outside air control valve 124 having a first port 124a connected to \first intake line 121, second port 124b connected to second intake line 122, and a third port 124c connected to third intake line 123.

Outside air control valve 124 may open or close the individual ports to allow outside air A1 introduced to first intake line 121 to pass through second intake line 122 at a predetermined bypass ratio. The bypass ratio of outside air A1 is not particularly limited, and may be determined according to a number of variables, including the output of stack 10, the temperature of coolant C, and the like. For example, outside air control valve 124 may increase the bypass ratio when the output of stack 10 or the temperature of coolant C increases, and may decrease the bypass ratio when the output of stack 10 or the temperature of coolant C decreases.

Condensate line 130 may connect the humidified air exhaust line 50 to the water inlet 103 of the evaporator 100. Condensate line 130 may be provided to use condensate water D produced through the condensation of moisture contained in humidified air A2 passing through humidified air exhaust line 50 for evaporation. For example, as illustrated in FIG. 1, Condensate line 130 may be provided with a condensate tank 132 for collecting and storing the condensate water D from humidified air A2 introduced to condensate line 130 through humidified air exhaust line 50, and a condensate valve 134 disposed between condensate tank 132 and water inlet 103 of evaporator 100 the opening or closing of which allows or prevents flow in condensate line 130. After condensate water D is stored in condensate tank 132, it may be supplied as the water for evaporation to interior space 101 of evaporator 100 through water inlet 103 when condensate valve 134 is open.

As described above, outside air A1 and the evaporation water may be supplied to interior space 101 of evaporator 100 through outside air inlet 102 and water inlet 103, respectively. Heat exchange may occur as cooling air heated by passing through second radiator 90 passes through the outer surface of evaporator 100. Heat exchange may simultaneously occur between evaporator 100 and first and second radiators 80 and 90 through heat conducting layer(s) 107. The water passing through interior space 101 of evaporator 100 may be heated and evaporated by the heat transferred from first and second radiators 80 and 90. After outside air A1 passing through interior space 101 of evaporator 100 is humidified by the water vapor produced through the evaporation of the water, it may be reintroduced to second intake line 122 through outside air outlet 104. Therefore, evaporator 100 may serve as a humidifier humidifying outside air A1.

As the evaporation water absorbs evaporative latent heat in the course of evaporation, it may absorb more heat from coolant C passing through first and second radiators 80 and 90 than when there is no evaporation. Thus, evaporator 100 may improve the heat dissipation performance of first and second radiators 80 and 90 through the aforementioned evaporative cooling. In addition, the evaporation water may also absorb the heat from cooling air A3 as well as coolant C in the course of evaporation. As illustrated in FIG. 2, because the temperature of cooling air A3 gradually decreases while cooling air A3 is passing through evaporator 100, lower temperature cooling air A3 may be supplied to first radiator 80 than if there is no evaporator 100. Therefore, evaporator 100 may further improve the heat dissipation performance of first radiator 80 through the cooling of cooling air A3.

As illustrated in FIG. 1, a cooling fan 110 may be disposed to allow cooling air A3 sucked by cooling fan 110 to pass through second radiator 90, evaporator 100, and first radiator 80 sequentially. However, the positioning of the cooling fan 110 is not limited thereto, and the cooling fan 110 may be disposed to allow the cooling air A3 discharged from cooling fan 110 to pass through the second radiator 90, evaporator 100, and first radiator 80 sequentially.

Air compressor 30 includes outside air inlet 32 connected to third intake line 123 and outside air outlet 34 connected to outside air supply line 40. Air compressor 30 may compress outside air A1 that has passed through third intake line 123 and supply the compressed air to stack 10.

Figure 3:
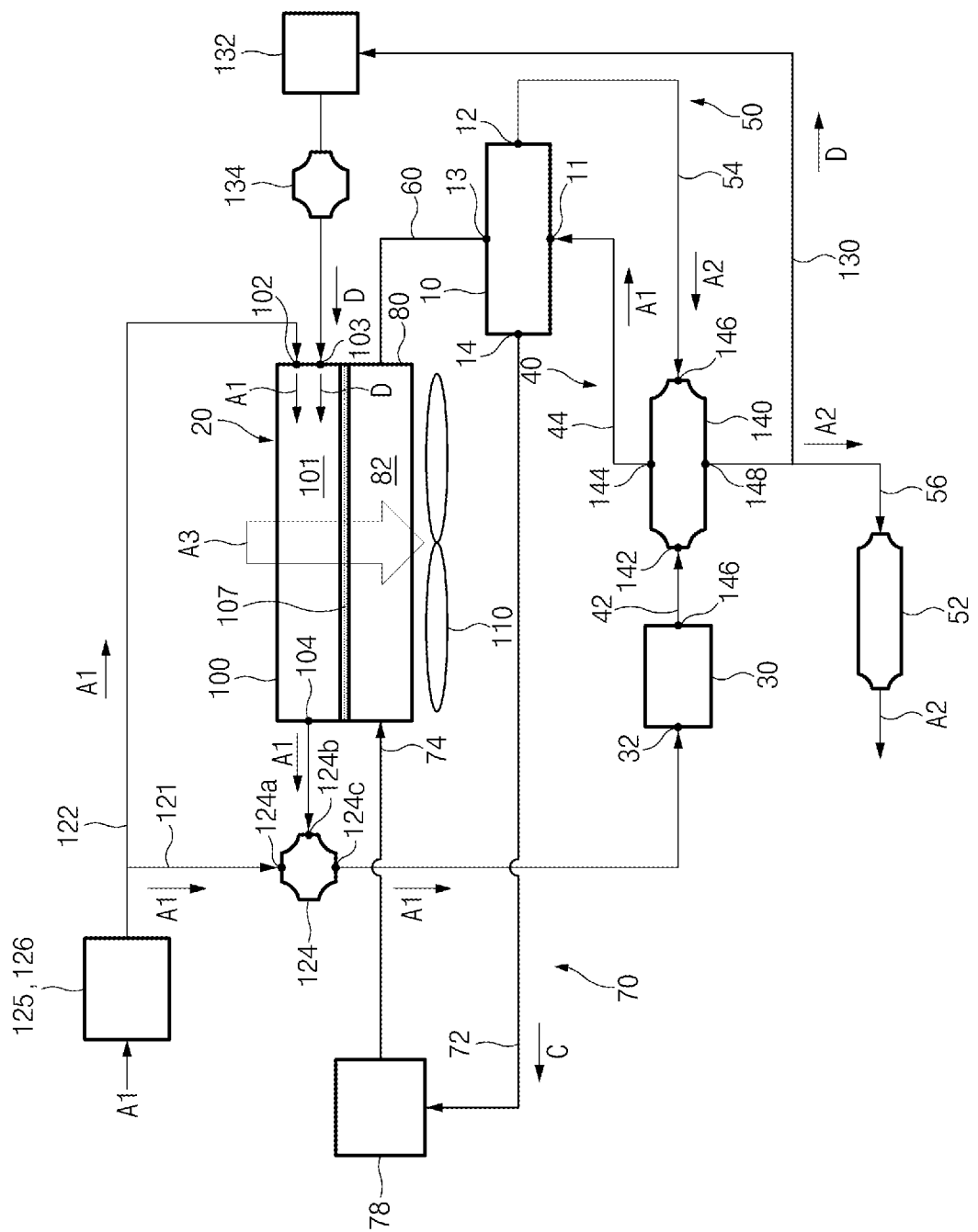
FIG. 3 illustrates the configuration of a fuel cell cooling system, according to a second example embodiment of the present disclosure.

FIG. 3 illustrates the configuration of a fuel cell cooling system, according to a second example embodiment of the present disclosure.

Referring to FIG. 3, a fuel cell cooling system 2 according to a second embodiment differs from fuel cell cooling system 1 according to the preceding embodiment in that it does not include second radiator 90, but further includes a humidifier 140. Hereinafter, fuel cell cooling system 2 is described with respect to these differences.

As illustrated in FIG. 3, heat exchange unit 20 according to the second embodiment differs from heat exchange unit 20 according to the preceding embodiment in that it does not include second radiator 90. In this configuration, coolant radiating line 70 does not include third radiating line 76.

As illustrated in FIG. 3, humidifier 140 includes an outside air inlet 142 connected to outside air outlet 34 of air compressor 30 through a first supply line 42, an outside air outlet 144 connected to outside air inlet 11 of stack 10 through a second supply line 44, a humidified air inlet 146 connected to humidified air outlet 12 of stack 10 through a first exhaust line 54 of humidified air exhaust line 50, and a humidified air outlet 148 communicating with the outside through a second exhaust line 56 of humidified air exhaust line 50.

Humidifier 140 may be a hollow fiber membrane humidifier able to humidify outside air A1 through moisture exchange between outside air A1 and humidified air A2. Humidifier 140 may humidify outside air A1 through the moisture exchange between outside air A1 introduced through outside air inlet 142 and humidified air A2 introduced through humidified air inlet 146. In other words, humidifier 140 may further humidify outside air A1 that has been humidified by evaporator 100. Therefore, compared to fuel cell cooling system 1, fuel cell cooling system 2 may increase the humidity of outside air A1 through further humidification. Outside air A1 passing through humidifier 140 may be supplied to stack 10 through second supply line 44, and humidified air A2 passing through humidifier 140 may be discharged externally through second exhaust line 56.

Figure 4:
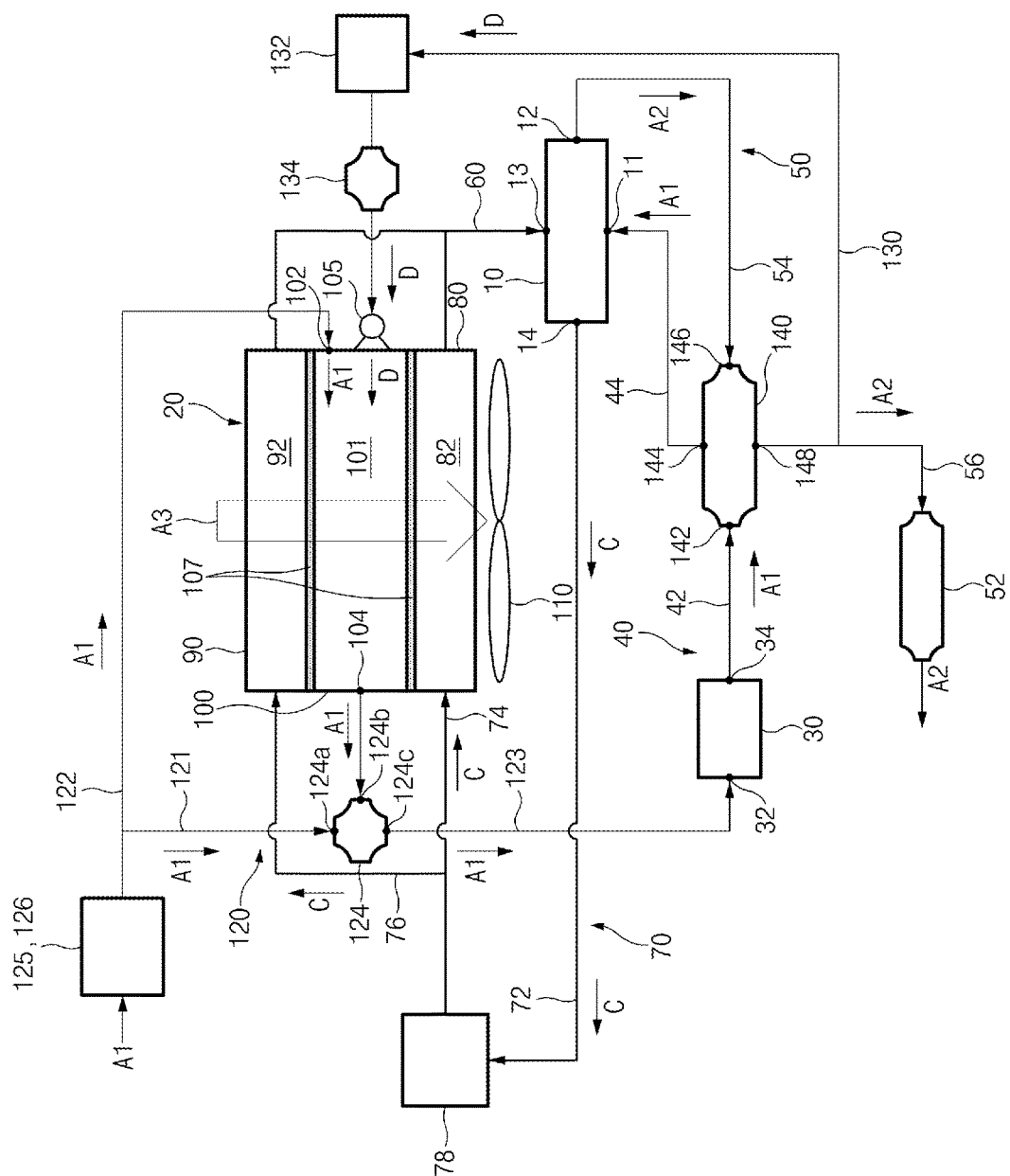
FIG. 4 illustrates the configuration of a fuel cell cooling system, according to a third example embodiment of the present disclosure.

FIG. 4 illustrates the configuration of a fuel cell cooling system, according to a third example embodiment of the present disclosure.

Referring to FIG. 4, fuel cell cooling system 3 according to the third embodiment differs from fuel cell cooling systems 1 and 2 according to the preceding embodiments in that it further includes a spray nozzle 105.

As illustrated in FIG. 4, evaporator 100 may be provided with spray nozzle 105 disposed on one side of evaporator 100 to communicate with interior space 101 of evaporator 100 and may be connected to condensate line 130. Spray nozzle 105 may spray droplets of water for evaporation to interior space 101 of evaporator 100 to allow the evaporation water to be uniformly distributed to interior space 101 of evaporator 100. Thus, spray nozzle 105 may allow outside air A1 passing through evaporator 100 to be uniformly humidified.

Figure 5:
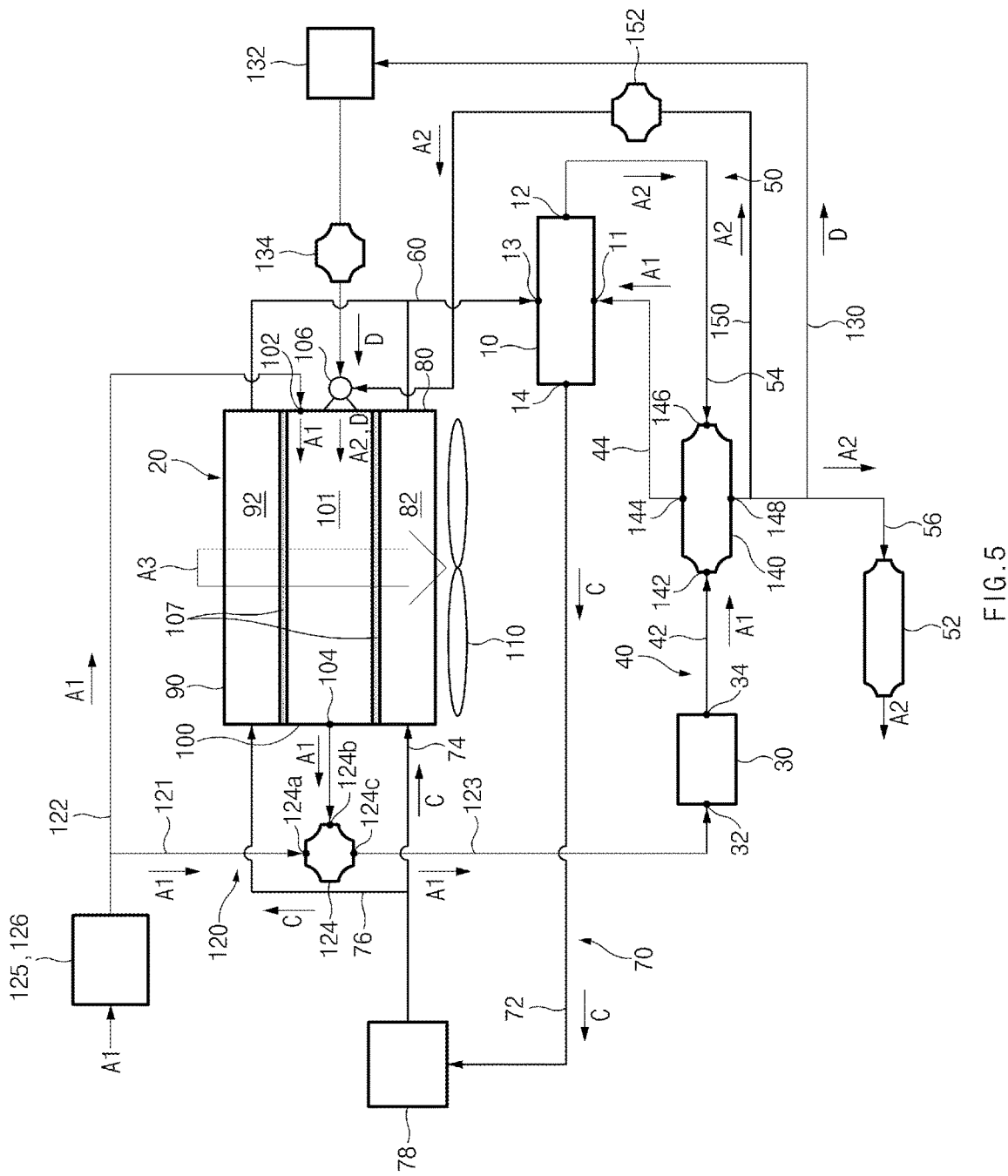
FIG. 5 illustrates the configuration of a fuel cell cooling system, according to a fourth example embodiment of the present disclosure.
Figure 6:
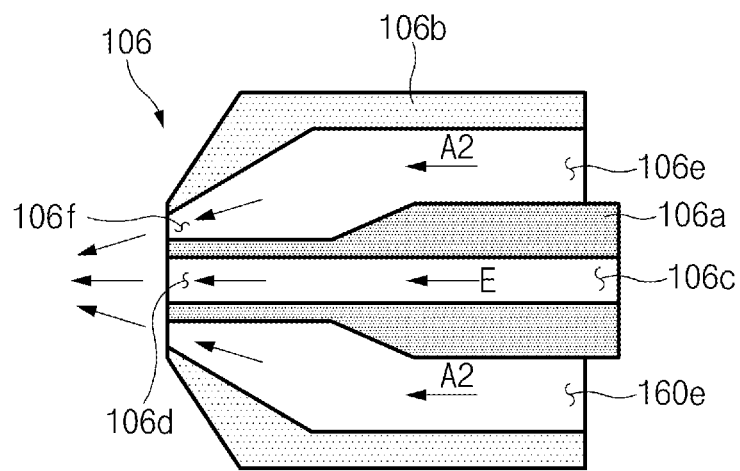
FIG. 6 is a cross-sectional view of a two-fluid nozzle of the fuel cell cooling system illustrated in FIG. 5.
Figure 7:
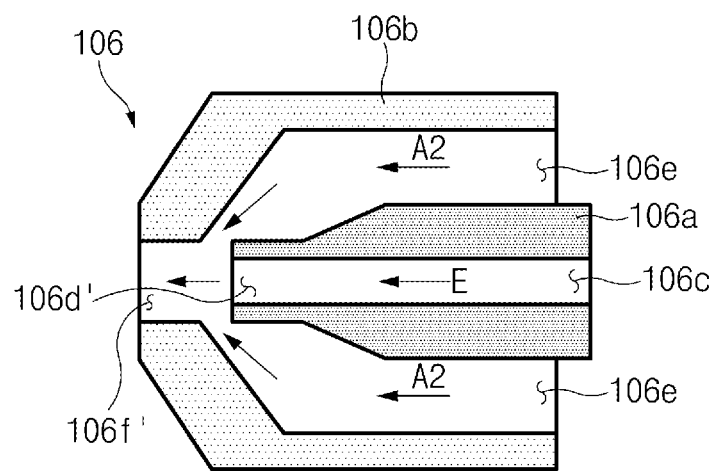
FIG. 7 is a cross-sectional view of an alternate structure of a two-fluid nozzle of the fuel cell cooling system illustrated in FIG. 5.

FIG. 5 illustrates the configuration of a fuel cell cooling system, according to a fourth example embodiment of the present disclosure. FIG. 6 is a cross-sectional view of the structure of a two-fluid nozzle in the fuel cell cooling system illustrated in FIG. 5, and FIG. 7 is a cross-sectional view of another structure of the two-fluid nozzle in the fuel cell cooling system illustrated in FIG. 5.

Referring to FIG. 5, fuel cell cooling system 4 according to the fourth embodiment differs from fuel cell cooling systems 1, 2, and 3 according to the preceding embodiments in that it further includes a two-fluid nozzle 106.

As illustrated in FIG. 5, evaporator 100 may be provided with two-fluid nozzle 106 disposed on one side of evaporator 100 to communicate with interior space 101 of evaporator 100. As illustrated in FIG. 6, two-fluid nozzle 106 includes a water spray nozzle 106a spraying water for evaporation (hereinafter also referred to as the "evaporation water E"), and an air spray nozzle 106b spraying humidified air A2.

Water spray nozzle 106a includes a water inlet 106c connected to condensate line 130, and a water outlet orifice 106d communicating with interior space 101 of evaporator 100.

Air spray nozzle 106b includes an air inlet 106e connected to humidified air bypass line 150, and an air outlet orifice 106f communicating with interior space 101 of evaporator 100. Humidified air bypass line 150 may connect second exhaust line 56 of humidified air exhaust line 50 to air inlet 106e, and allow high pressure humidified air A2 passing through second exhaust line 56 to be introduced to air inlet 106e. A humidified air control valve 152 may be provided on humidified air bypass line 150, the opening or closing of which controls flow in humidified air bypass line 150.

As illustrated in FIG. 6, air spray nozzle 106b may be configured to enclose the outer circumferential surface of water spray nozzle 106a. In other words, water spray nozzle 106a may be accommodated in an interior space of air spray nozzle 106b. The diameter of air spray nozzle 106b may gradually taper in a direction toward air outlet orifice 106f.

In the two-fluid nozzle 106 configuration illustrated in FIG. 6, evaporation water E introduced to water inlet 106c may be sprayed through water outlet orifice 106d, and humidified air A2 introduced to air inlet 106e may be sprayed through air outlet orifice 106f. Then, evaporation water E and humidified air A2 may combine and mix outside of the two-fluid nozzle 106, resulting in evaporation water E being further atomized to smaller droplets compared to evaporation water sprayed through spray nozzle 105. Therefore, compared to spray nozzle 105, two-fluid nozzle 106 may allow outside air A1 passing through evaporator 100 to be humidified more uniformly.

While two-fluid nozzle 106 has been described as an external mix two-fluid spray nozzle in which evaporation water E and the humidified air A2 combine and mix outside of the two-fluid nozzle 106, but the configuration is not limited thereto. For example, as illustrated in FIG. 7, two-fluid nozzle 106 may be an internal mix two-fluid spray nozzle in which a water outlet orifice 106d' is positioned inside of air spray nozzle 106b such that evaporation water E and humidified air A2 combine and mix inside of two-fluid nozzle 106 and are then sprayed together through an air outlet orifice 106f'.

Figure 8:
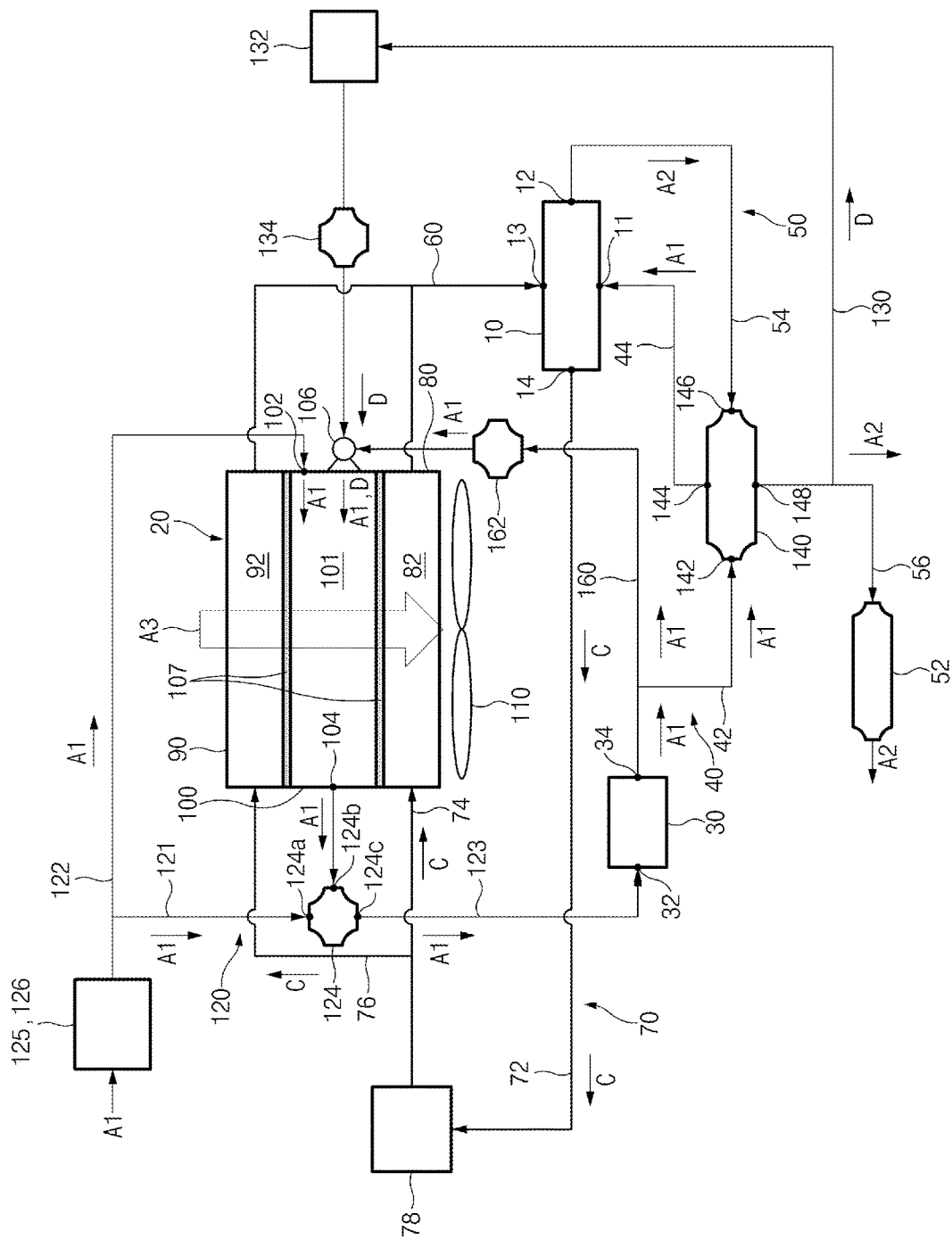
FIG. 8 illustrates the configuration of a fuel cell cooling system, according to a fifth example embodiment of the present disclosure.

FIG. 8 illustrates the configuration of a fuel cell cooling system, according to a fifth example embodiment of the present disclosure.

Referring to FIG. 8, fuel cell cooling system 5 according to the fifth embodiment differs from the fuel cell cooling system 4 according to the preceding embodiment in that outside air A1 discharged from outside air outlet 34 of air compressor 30 is supplied to two-fluid nozzle 106.

As illustrated in FIG. 8, air inlet 106e of air spray nozzle 106b may be connected to an outside air bypass line 160. Outside air bypass line 160 may connect first supply line 42 to air inlet 106e to allow high pressure outside air A1 passing through first supply line 42 to be introduced to air inlet 106e. Then, the evaporation water E may be mixed with outside air A1 passing through first supply line 42 by e two-fluid nozzle 106 to become droplets. An outside air control valve 162 may be provided on outside air bypass line 160, the opening or closing of which controls flow in outside air bypass line 160.

Because first supply line 42 is a line to which outside air A1 compressed by air compressor 30 is directly introduced, outside air A1 passing through first supply line 42 has higher pressure than that of humidified air A2 passing through second exhaust line 56. Therefore, the evaporation water E may be further atomized to smaller droplets, compared to a case in which it is mixed with humidified air A2 passing through second exhaust line 56.

The fuel cell cooling systems, according to the example embodiments of the present disclosure, may have the following effects:

First, the water passing through the evaporator may be evaporated using the heat from the first and second radiators, and thus the evaporative cooling of the coolant passing through the first and second radiators may improve heat dissipation performance of the radiators.

Second, the outside air to be supplied to the stack may be humidified using the water vapor produced through the evaporation of the water. Thus, there may be no need to install a humidifier, leading to a reduction in installation cost, or the outside air may be secondarily humidified to increase the humidity thereof.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A fuel cell cooling system, comprising:
   a heat exchange unit having a radiator dissipating heat contained in a coolant and an evaporator disposed to exchange heat with the radiator and evaporate water using the heat from the radiator to humidify outside air; and
   an air compressor compressing the outside air passing through the evaporator and supplying the compressed air to a fuel cell stack.

2. The fuel cell cooling system according to claim 1, further comprising:
an outside air intake line connected to the air compressor, wherein the outside air is introduced to the outside air intake line; and
an outside air supply line connecting the air compressor to the fuel cell stack.

3. The fuel cell cooling system according to claim 2, wherein the outside air intake line comprises:
a first intake line to which the outside air is introduced;
a second intake line allowing outside air to bypass the first intake line and pass through the evaporator; and
a third intake line delivering the outside air passing through the first intake line and the second intake line to the air compressor.

4. The fuel cell cooling system according to claim 3, further comprising an outside air control valve including a first port connected to the first intake line, a second port connected to the second intake line, and a third port connected to the third intake line, wherein opening or closing the individual ports allows the outside air to flow through the second intake line at a predetermined ratio compared to the flow in the first intake line.

5. The fuel cell cooling system according to claim 1, wherein the water for evaporation is condensate water produced by the fuel cell stack.

6. The fuel cell cooling system according to claim 5, further comprising:
a condensate line connecting a humidified air outlet of the fuel cell stack to a water inlet of the evaporator;
a condensate tank provided on the condensate line and storing the condensate water produced through condensation of moisture contained in humidified air discharged from the fuel cell stack; and
a condensate valve provided between the condensate tank and the water inlet on the condensate line,
wherein opening or closing of the condensate valve controls flow in the condensate line.

7. The fuel cell cooling system according to claim 1, wherein the heat exchange unit further includes a cooling fan allowing cooling air to flow for heat exchange with the radiator and the evaporator.

8. The fuel cell cooling system according to claim 7, wherein the radiator is positioned downstream of the evaporator in the flow path of the cooling air.

9. The fuel cell cooling system according to claim 8, wherein the heat exchange unit further comprises a second radiator positioned upstream of the evaporator in the flow path of the cooling air.

10. The fuel cell cooling system according to claim 9, further comprising:
a coolant radiating line delivering the coolant discharged from the fuel cell stack to each of the first radiator and the second radiator; and
a coolant recovery line recovering the coolant passing through the coolant radiating line to introduce the coolant to the fuel cell stack.

11. The fuel cell cooling system according to claim 10, wherein the coolant radiating line comprises:
a first radiating line connected to the fuel cell stack;
a second radiating line connecting the first radiating line to the coolant recovery line and having the first radiator provided thereon; and
a third radiating line connecting the second radiating line to the coolant recovery line and having the second radiator provided thereon.

12. The fuel cell cooling system according to claim 1, further comprising a spray nozzle for spraying the water for evaporation into the outside air that is passing through an interior space of the evaporator.

13. The fuel cell cooling system according to claim 1, further comprising a two-fluid nozzle for mixing and spraying the outside air passing through the air compressor and the water for evaporation.

14. The fuel cell cooling system according to claim 13, further comprising an outside air bypass line connecting the air compressor to the two-fluid nozzle.

15. The fuel cell cooling system according to claim 1, further comprising a humidifier disposed between the air compressor and the fuel cell stack, wherein the humidifier further humidifies the outside air discharged from the air compressor using humidified air discharged from the fuel cell stack.

16. The fuel cell cooling system according to claim 15, further comprising a two-fluid nozzle for mixing and spraying the humidified air and the water for evaporation.

17. The fuel cell cooling system according to claim 16, further comprising a humidified air bypass line connecting the humidifier to the two-fluid nozzle.

18. The fuel cell cooling system according to claim 1, wherein the heat exchange unit further includes a heat conducting layer interposed between the radiator and the evaporator.

19. The fuel cell cooling system according to claim 18, wherein the heat conducting layer is formed of brazing filler.

* * * * *